United States Patent [19]

Grovum

[11] Patent Number: 4,775,165

[45] Date of Patent: Oct. 4, 1988

[54] DEVICE FOR PREVENTING JACKKNIFING OF A TRACTOR-TRAILER RIG

[76] Inventor: Orville B. Grovum, P.O. Box 473, Hawley, Minn. 56549

[21] Appl. No.: 947,865

[22] Filed: Dec. 30, 1986

[51] Int. Cl.$^4$ .............................................. B62D 53/10
[52] U.S. Cl. ............................ 280/432; 280/DIG. 14
[58] Field of Search ................ 280/432, 426, DIG. 14

[56] References Cited

U.S. PATENT DOCUMENTS

| | | | |
|---|---|---|---|
| 2,959,429 | 11/1960 | Lavelle | 280/432 |
| 3,580,610 | 5/1971 | Warren | 280/432 |
| 3,883,160 | 5/1975 | Meyer et al. | 280/432 |
| 4,405,145 | 7/1983 | Bergman et al. | 280/432 |

Primary Examiner—John J. Love
Assistant Examiner—Donn McGiehan
Attorney, Agent, or Firm—Kinney & Lange

[57] ABSTRACT

An anti-jackknife system for use while towing a trailer with a tractor. The tractor and trailer are coupled to each other by a fifth-wheel assembly in known manner. The fifth-wheel assembly includes a wheel plate carried by the tractor and a cooperating pin carried by the trailer, the pin being rotatable within the wheel plate when the tractor and trailer are coupled to each other. First and second abutments are carried by the trailer on opposing sides of the pin. The abutments move in paths around the pin on a change in orientation between the tractor and trailer, as during turning, for example. Fluid-actuated cylinders are carried by the tractor on opposing sides of the wheel plate with each cylinder providing a stop movable between a first position out of the abutment path. The stops are normally in the second position. A jackknife condition is detected to actuate at least one of the fluid-actuated cylinders to move its associated stop into the first position. In a preferred embodiment, a back-up state of the tractor disables movement to the fluid-actuated cylinders while a steering motion selectively disables one of the cylinders.

15 Claims, 3 Drawing Sheets

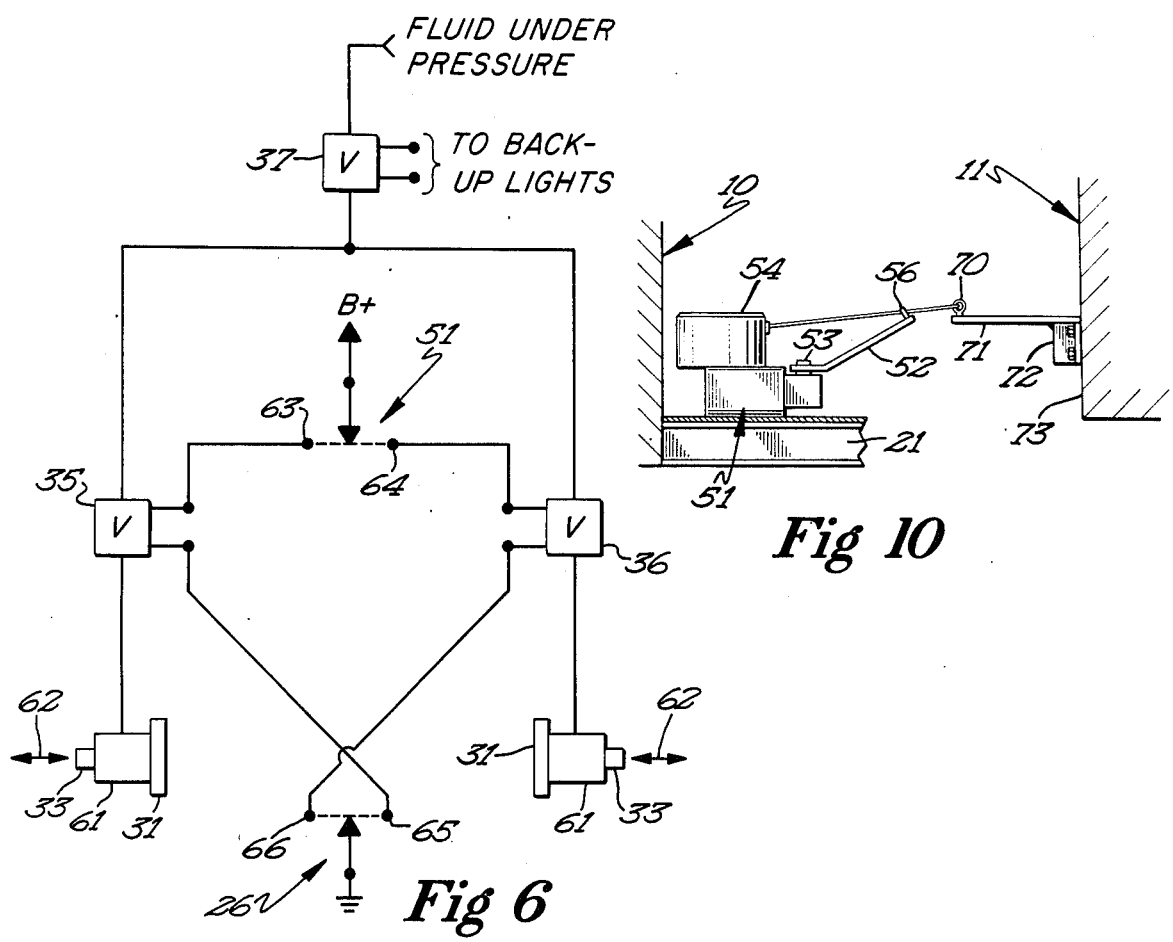
Fig 6
Fig 10
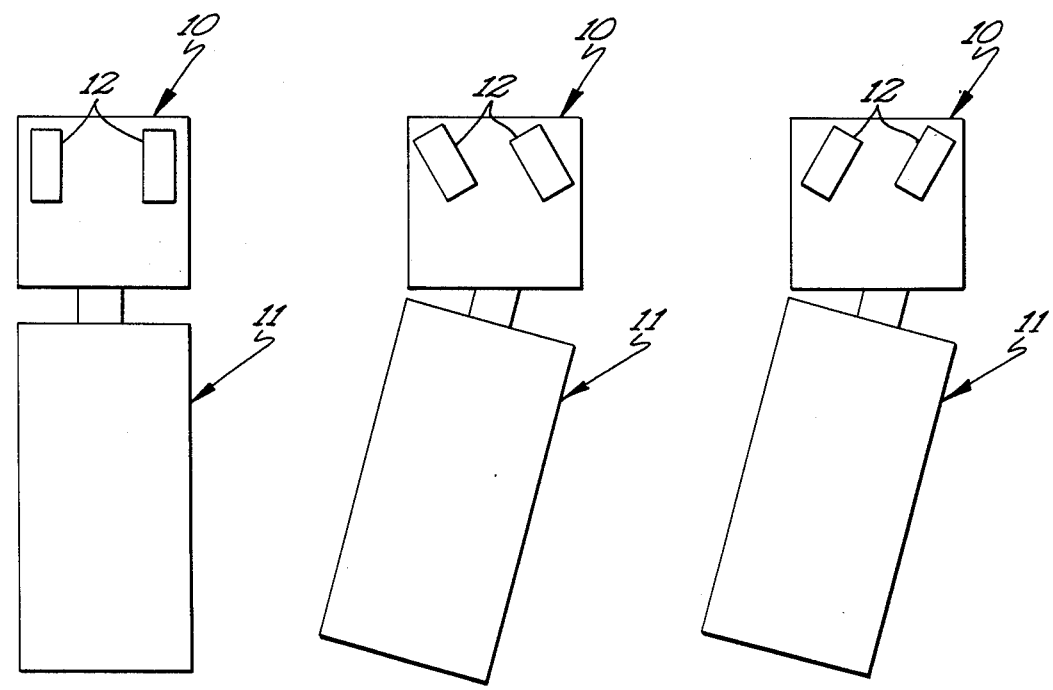
Fig 7  Fig 8  Fig 9 and without interferring with normal steering of such a rig.

DEVICE FOR PREVENTING JACKKNIFING OF A TRACTOR-TRAILER RIG

BACKGROUND OF THE INVENTION

1. Field of the Invention

The present invention relates to an anti-jackknife system and, particularly, to a system for preventing a jackknife condition while allowing normal backing of a tractor-trailer rig and without interferring with normal steering of such a rig.

2. Description of the Prior Art

Tractor-trailer rigs are very well-known to highway travelers. Typically, such rigs are formed of two primary units—a trailer which is towed by a tractor, the trailer being connected to the tractor by a fifth-wheel assembly. The primary elements of the fifth-wheel assembly include a wheel plate carried by the tractor and a fifth-wheel pin. The pin and wheel plate provide a pivotal connection between the trailer and tractor.

A "jackknife" condition is a concern to all tractor-trailer rig drivers, whether they have experienced such a condition or not. The term "jackknife" is commonly employed to describe a misalignment between the trailer and tractor with the trailer pivoting, out of control, about its fifth-wheel pivot connection to the tractor.

Several devices have been proposed for controlling a jackknife condition. For example, Capps U.S. Pat. No. 4,119,330 provides abutments on opposing sides of the fifth-wheel plate with a stop being provided on the trailer. In the event of a jackknife condition, the stop will engage one of the abutments to limit the extent of the jackknife condition. However, so as to not unduly interfere with normal operation of the tractor-trailer rig, the stop/abutment system of Capps is operative only after the jackknife condition has advanced to a significant degree. Capps also discloses an electromagnetic system to restrain pivotal movement between the tractor and trailer.

Kornoelje U.S. Pat. No. 3,963,265 describes a system in which a vertically retractable pin is employed to engage stops located on the underside of the trailer. The pin is biased to an extended or elevated (stop engaging) position and retracted by a fluid system to permit normal turning of the tractor-trailer rig. Other systems are disclosed in U.S. Pat. Nos.: 3,883,160; 3,733,090; 3,701,547; 3,618,983; and 4,341,395.

SUMMARY OF THE INVENTION

The present invention provides an anti-jackknife system similar in intent to those noted above. However, the system of the present invention detects a jackknife condition to actuate stop members carried by the tractor, the stop members acting in cooperation with abutments carried by the trailer to limit the detected jackknife condition. During normal steering or back-up, actuation of the stop members is disabled, thus allowing a normal operation of the tractor-trailer rig. In this manner, the jackknife condition may be limited without the necessity of driver intervention and without interferring with normal rig operation.

In a preferred embodiment, the present invention employs first and second abutments carried by the trailer on opposing sides of the fifth-wheel pin. The abutments move in paths around the pin on a change in orientation between the tractor and trailer (as during turning or during a jackknife condition). First and second fluid-actuated cylinders are carried by the tractor on opposing sides of the fifth-wheel plate, the fluid-actuated cylinders each having associated stop members movable between a first position within the path of an abutment and a second position out of the abutment path. The stop members are normally maintained in the second position out of the abutment member paths. Thus, so long as the stop members are in the second position, normal tractor-trailer rig operation is maintained. However, the present invention also provides a device responsive to a jackknife condition to actuate at least one of the fluid-actuated cylinders for moving an associated stop member to the first (jackknife limiting) position.

Also in a preferred embodiment, a back-up condition of the trailer may be employed to disable actuation of a fluid-actuated cylinder to allow normal backing action without engagement between a stop member and abutment. Similarly, normal steering may be detected to disable the appropriate fluid-actuated cylinder to allow a normal steering operation without actuation of a fluid-actuated cylinder and, accordingly, engagement between an abutment and a stop member.

BRIEF DESCRIPTION OF THE DRAWINGS

FIG. 6 is a diagrammatic illustration of the fluid interconnections and controls for the components forming a preferred embodiment of the present invention.

FIGS. 7-9 are diagrammatic illustrations of straight, turning and jackknife orientations during forward travel of a tractor and trailer interconnected in a conventional fashion.

FIG. 10 illustrates an alternative embodiment to the jackknife condition detector of FIG. 5, the embodiment of FIG. 10 also being located in the general location indicated by the arrow 5 in FIG. 1.

DETAILED DESCRIPTION OF THE PREFERRED EMBODIMENTS

Figure 1:
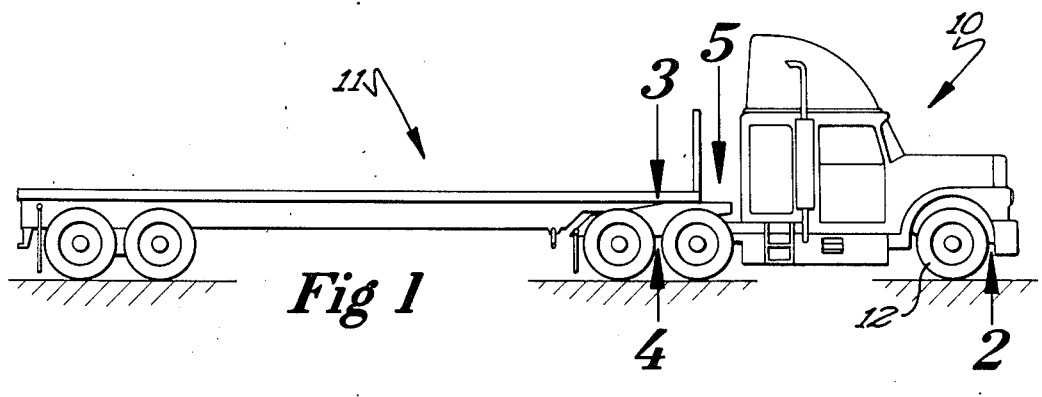
FIG. 1 is a side view of a typical prior art tractor-trailer rig indicating the general location of the major components employed in the practice of the present invention.

FIG. 1 illustrates a side view of a typical prior art tractor-trailer rig formed of a tractor designated generally at 10 and a trailer designated generally at 11. As is known in the prior art, the tractor and trailer illustrated in FIG. 1 are interconnected by a fifth-wheel assembly which allows the tractor 10 to tow the trailer 11 while allowing a pivotal movement between them to facilitate turning during forward and back-up movement. The number of wheel sets in such rigs is variable and forms no part of the present invention. However, a jackknife condition can be understood in the context of the orientation of the front or steering wheels 12 and the trailer 11. For example, in FIG. 7 there is illustrated a general alignment between the steering wheels 12 and a trailer 11 as is typical in a straight ahead or forward movement of the tractor-trailer rig. FIG. 8 illustrates a typical turning orientation between the steering wheels 12 and trailer 11, this orientation being common both during forward and back-up movement of the tractor 10. FIG. 9 illustrates what is often referred to a "jackknife" condition during forward movement of the tractor-trailer rig. In this orientation, the wheels 12 are turned as they would be during a right-hand turn. However, as illustrated, the trailer 11 is not "following" as it would during a normal turn. Instead, the trailer 11 is pivoting in a "non-following" condition. The jackknife condition can, and often does, have disasterous results with the trailer 11 pivoting around the tractor 10 and the driver having no ability to stop or control that movement. It should be noted, that the orientations of FIGS. 7-9 are all "normal" orientations during back-up operations. In addition, the general orientation of the tractor 10 and trailer 11 in FIGS. 8 and 9 are essentially identical even though the condition illustrated in FIG. 8 is a "normal" condition during forward rig movement while that illustrated in FIG. 9 is a "out of control" condition during forward rig movement when the orientation of the steering wheel 12 is considered.

The present invention recognizes that a jackknife condition may be detected by responding to the general orientation between the tractor and trailer, but that other factors must also be accounted for before remedial action is taken or warranted. That is, the present invention accommodates normal turning (as represented in FIG. 8) as well as tractor-trailer orientations that might indicate a jackknife condition during forward movement, but which are normal during back-up conditions (as represented in FIG. 9).

Figure 2:
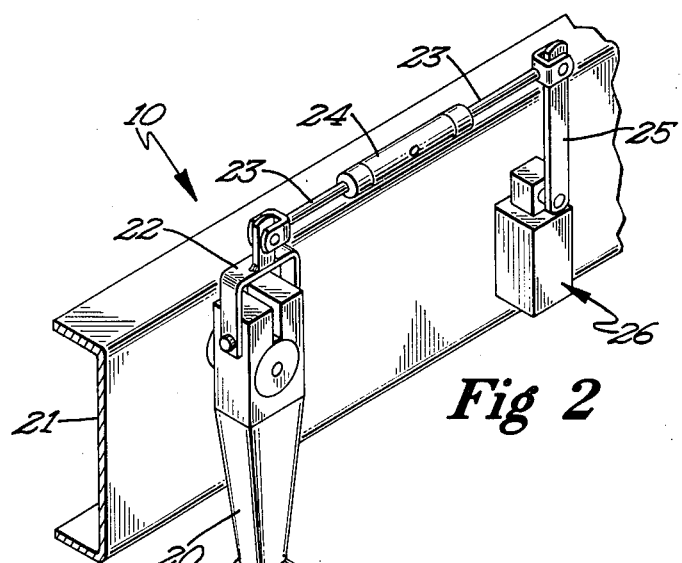
FIG. 2 diagrammatically illustrates a steering motion responsive device in accordance with the present invention located generally where indicated by arrow 2 in FIG. 1.

FIG. 2 illustrates a device in accordance with the present invention which detects steering motion by which a particular orientation between a tractor 10 and trailer 11 may be discriminated as either "normal" or a "jackknife" condition. The device illustrated in FIG. 2 is located generally at the location of the arrow 2 of FIG. 1 and includes a typical steering arm 20 pivoted on a portion of the tractor frame 21. A steering arm bracket 22 is provided from which a tie-rod 23 having an adjustable linkage 24 extends. The tie-rod 23 extends to a lever 25 which operates a limit switch 26. The limit switch 26 is a normally-open, two-position limit switch whose operation is described more fully below with reference to FIG. 6. For the moment, it is sufficient to note that as the steering arm 20 moves to alter the orientation of the wheels 12 (see FIGS. 7-9) this movement is communicated to the switch 26 to close one of the contacts of the switch 26.

Figure 3:
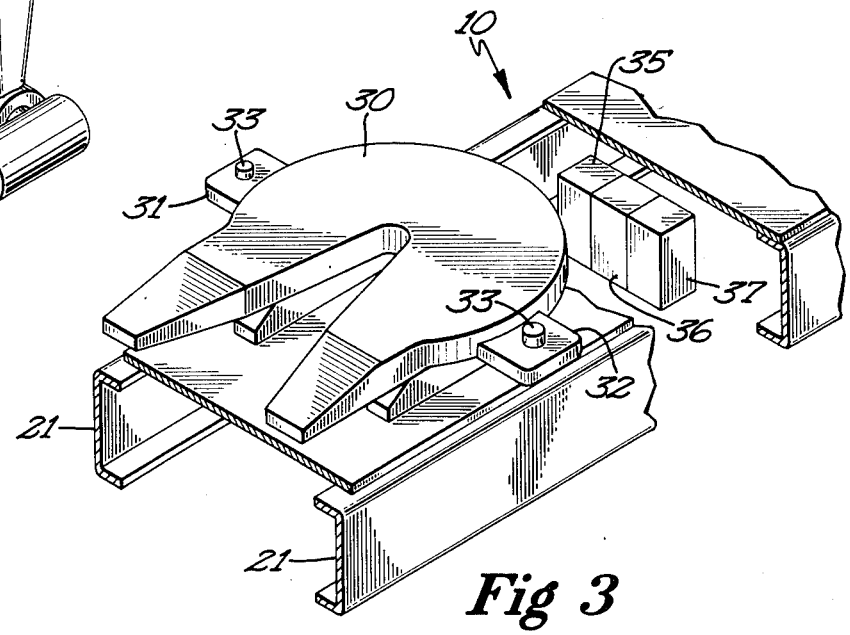
FIG. 3 generally illustrates a fifth-wheel plate carried by a tractor, and associated components in accordance with the present invention, located generally where indicated by arrow 3 in FIG. 1.

FIG. 3 illustrates a portion of the frame of the tractor 10 in the general area indicated by the arrow 3 of FIG. 1 and including a typical prior art fifth-wheel plate 30. Secured to the wheel plate 30, on opposing sides thereof, are blocks 31 and 32, each of the blocks 31 and 32 supporting a fluid-actuated cylinder having a piston actuated rod 33. In the context of a tractor-trailer rig, the cylinders, from which the rods 33 extend, are pneumatic cylinders of known design and may be single-acting cylinders spring-biased in the retracted position.

In the retracted position, the ends of the rods 33 are positioned below or at the plane defined by the upper surface of the wheel plate 30 such that, in the retracted position, the rods 33 do not interfere with normal tractor-trailer pivoting movement. Fluid under pressure is provided to activate the cylinders carried by the blocks 31 and 32 may be controlled by solenoid-controlled valves 35 and 36, the valve 35 providing fluid under pressure to the cylinder carried by block 31 while the valve 36 provides fluid under pressure for activation of the cylinder carried by the block 32. Valves 35 and 36 are normally closed. With the valves 35 and 36 in the closed position, the rods 33 are retracted to or below the plane defined by the upper surface of the wheel plate 30. Fluid to valves 35 and 36 may be controlled by a further solenoid-controlled valve 37, the valve 37 being normally open. Thus, the solenoid controlled valve 37 may be closed to disable movement of the rods 33 as by blocking pressurized fluid from the valves 35 and 36. Control of the valves 35-37, as well as movement of the rods 33, is described more fully below with reference to FIG. 6.

Figure 4:
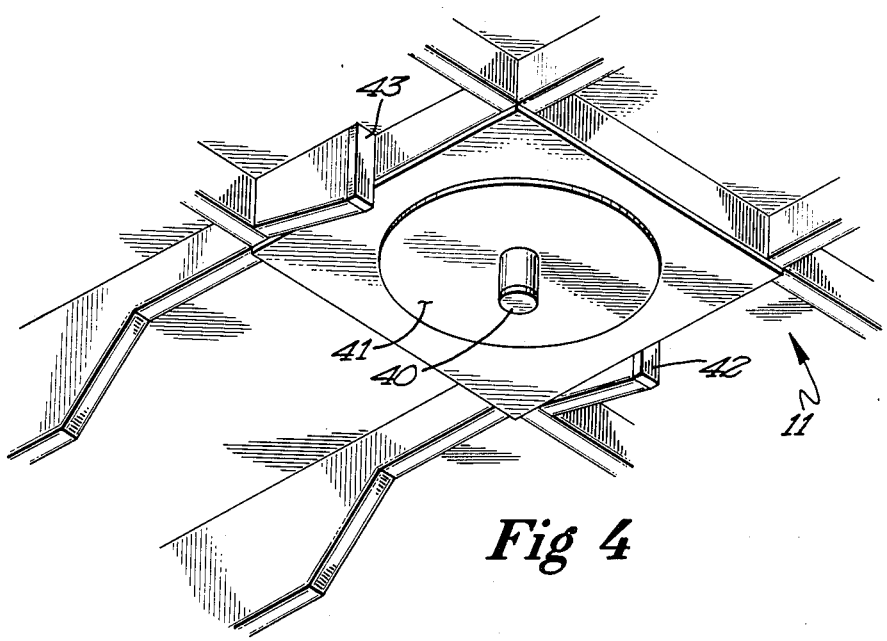
FIG. 4 illustrates a fifth-wheel pin of a conventional trailer, and associated components in accordance with the present invention, located generally where indicated by arrow 4 in FIG. 1.

FIG. 4 illustrates the underside of a typical prior art trailer in the general area indicated by the arrow 4 in FIG. 1 and includes a showing of a pin 40 and surrounding support plate 41, the pin 40 cooperating with the wheel plate 30 of FIG. 3 in known manner to couple the tractor 10 to the trailer 11. Abutments 42 and 43 are carried by and secured to the frame or wheel plate 30 of the trailer 11 and project downwardly from that frame. The downward projection of the abutments 42 and 43 is sufficient such that those abutments will be engaged by the rods 33 (see FIG. 3) when those rods are in the extended position, but will clear the rods 33 when the rods 33 are in their normal, retracted position. Thus, the abutments 42 and 43, in cooperation with the rods 33, may act to limit the pivoting movement between the trailer 11 and tractor 10 when the rods 33 are extended, but will not interfere with normal pivoting movement between the trailer 11 and tractor 10 when the rods 33 are in the normal, retracted position.

Figure 5:
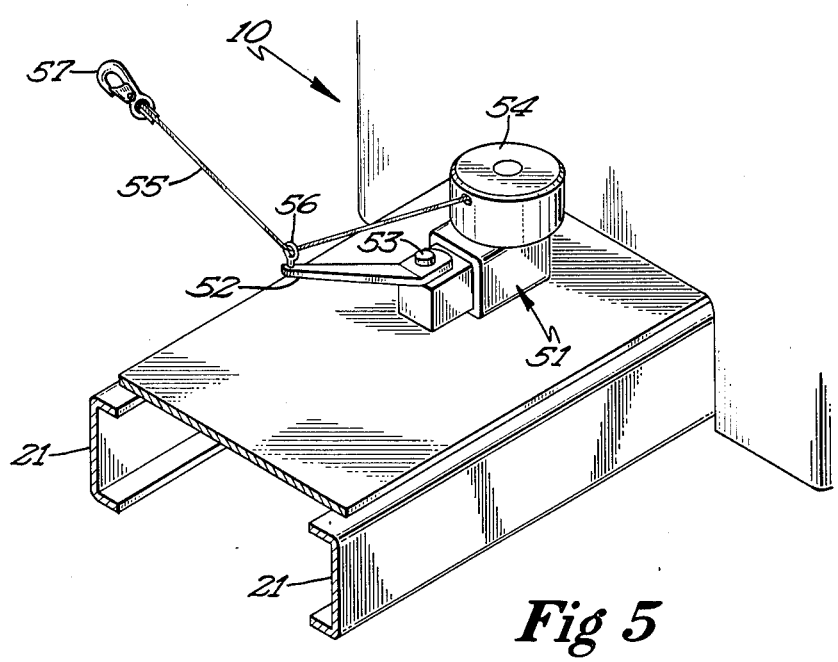
FIG. 5 illustrates one preferred embodiment of a device for detecting a jackknife condition in accordance with the present invention and located generally where indicated by arrow 5 in FIG. 1.

FIG. 5 illustrates an orientation detection system carried by the tractor 10 in the general area indicated by the arrow 5 in FIG. 1 and includes a two-position limit switch 51 having a lever 52 formed as a wand extending therefrom. Movement of the wand 52 about a pivot connection 53 will cause one of two contacts of the switch 51 to close in a manner described more fully below with reference to FIG. 6. A cord reel 54 is carried by the switch 51 with a cord 55 extending therefrom through an eyelet 56 carried by the wand 52. A clip 57 is provided at the end of the cord 55 to be secured to the trailer in any desired manner. As can be readily seen, with the clip 57 secured to the trailer 11 at a location generally rearwardly from the location of the switch 51, the wand 52 will be in the "central" position when the tractor 10 and trailer 11 are in the relative orientation illustrated in FIG. 7. The switch 51 is a normally-open, two-position limit switch. Thus, with the relative tractor-trailer orientation of FIG. 7, the switch 51 is open. However, as the trailer 11 assumes an orientation other than that illustrated in FIG. 7, that illustrated in FIGS. 8 or 9, for example, a tension will be applied to the cord 55 causing the wand 56 to pivot about the pivot 53 to result in a closing of one of the contacts of the switch 51. This contact closing of switch 51 may be employed as a primary jackknife condition indicator. The cord reel 54 maintains sufficient tension in the cord 55 to cause the wand 52 to pivot while allowing the cord 55 to extend during a pivoting orientation or reorientation of the tractor 10 and trailer 11.

Referring now to FIG. 6, there is illustrated the interconnection between the various valves and switches from which the interrelationship of the various components of FIGS. 2-5 will be appreciated. The valve 37 has its inlet connected to a supply of fluid under pressure such as a compressor onboard the tractor. The outlet of the valve 37 is connected to each of the valves 35 and 36 with the output of valve 35 connected to a cylinder 61 carried by the block 31 (see FIG. 3). Similarly, the output of valve 36 is connected to a cylinder 61 carried by a block 32 (see FIG. 3). The rods 33 of the cylinders 61 extend and retract as represented by the arrow 62 with the retracted position being the normal or at-rest position of the rods 33. Preferrably, the cylinders 61 are single acting cylinders with the rods 33 spring-biased to the retracted position.

Switch 51 (see FIG. 5) is a normally-open, two-position limit switch connected to a positive power supply such as an onboard battery. Dependent on movement of the wand 52 (see FIG. 5) the switch 51 will close either of contact terminals 63 or 64. Terminal 63 is connected to the valve 35 and to a terminal or contact 65 of switch 26. Similarly, contact 64 of switch 51 is connected to valve 36 and to a terminal 66 of switch 26. As illustrated, switch 26 is a normally-open, two-position switch which may close either of contacts 65 or 66 and is also connected to the common or ground terminal of the power supply associated with switch 51.

In operation, with the switch 51 positioned to close on contact 63 and switch 26 positioned to close contact 65, the terminals of valve 35 are energized by connection across the power supply with the valve 35 then opening to deliver fluid under pressure to the cylinder 61 carried by block 31. In this condition, the rod 33 associated with block 31 will extend to provide a stop against which the abutment 42 will engage as the abutment 42 travels in a path around the pin 40. The noted conditions of the switches 26 and 51 correspond to the condition illustrated in FIG. 9—a general indication of a jackknife condition as described with reference to FIG. 9. Thus, so long as fluid under pressure is available to the valve 35, the stop formed by rod 33 associated with block 31 will extend to limit further pivoting of the trailer 11 relative to the tractor 10. However, in the event that the orientation between the tractor 10 and trailer 11 illustrated in FIG. 9 results from a back-up operation of the tractor-trailer rig, a closing of the valve 37 will block the fluid supply from the valve 35. In this manner, extension of the rod 33 is disabled and normal back-up operation is allowed. The valve 37, a normally-open valve, is connected to respond to power delivered to the back-up lights of the tractor 10 such that power to those back-up lights will cause the valve 37 to close and disable the delivery of the fluid under pressure to either of the cylinders 61 illustrated in FIG. 6.

From the above, it should be apparent that the anti-jackknife system of the present invention may be provided as a retrofit to existing tractor-trailer rigs and will not interfere with the normal operation of those rigs during either normal forward movement or back-up movement. During a "left" turn, for example (as represented in FIG. 8), switch 51 will have the contact 63 closed while the switch 26 will have the contact 66 closed. Thus, neither of the solenoid-actuated valves 35 or 36 is actuated and fluid is blocked from cylinders 61.

Similarly, during a "right" turn, contact 64 with switch 51 will be closed while contact 65 of switch 26 will be closed. Again, neither of valves 35 or 36 will be actuated. During back-up operation, normally-open valve 37 will be closed preventing or disabling operation of either of the cylinders 61.

Obviously, many modifications and variations of the present invention are possible in light of the above teachings. For example, FIG. 10 illustrates an alternative embodiment of that component illustrated in FIG. 5. In the embodiment of FIG. 10, the elements 51-56 correspond directly to those illustrated and described above with reference to FIG. 5. However, the cord 55 extends through the eyelet 56 to a connection 70 on a bar 71. Bar 71 may be a square bar secured, as by a block 72, to the leading wall 73 of the trailer 11. Bar 71 extends from the trailer 11 toward the switch 51 and is generally non-rotatable with respect to the trailer 11. Thus, a change in orientation of the trailer 11 results in a movement of rod 71 causing a corresponding movement in the wand 52 to close one of the contacts of the switch 51. It is therefore to be understood that, within the scope of the appended claims, the invention may be practiced otherwise than is specifically described.

What is claimed is:

1. An anti-jackknifing system for use while towing a trailer with a tractor, the tractor and trailer being coupled by a fifth-wheel assembly including a wheel plate carried by the tractor and a cooperating pin carried by the trailer with the pin being rotatable within the wheel plate when coupled, the anti-jackknifing system comprising:
    first and second abutment means carried by said trailer on opposing sides of said pin, said abutment means moving in paths around said pin on a change in orientation between said tractor and trailer;
    first and second fluid-actuated means carried by said tractor on opposing sides of said wheel plate, said fluid-actuated means each having associated stop means movable between a first position within the path of an abutment means and a second position out of said abutment means path, said stop means being normally maintained in said second position;
    means responsive to a jackknife condition due to a change in position between the trailer and the tractor for actuating at least one of said fluid-actuated means for moving an associated stop means to said first position, said
jackknifing condition responsive means comprising;
    first and second normally-closed fluid valve means each connected to selectively power a different one of said hydraulic cylinder means; and
    means responsive to the orientation between tractor and trailer to selectively open said first and second normally-closed valve means and including normally-open, two-way limit switch means carried by said tractor means, wand means for closing switch means and extensible means extending from said wand means for moving said wand means between said tractor and trailer.

2. The anti-jackknife system of claim 1 wherein said fluid-actuated means comprise single-acting hydraulic cylinders spring-biased in a retracted condition.

3. The anti-jackknife system of claim 1 wherein said extensible means is carried by a retractable reel secured to said tractor.

4. The anti-jackknife system of claim 3 wherein said extensible means comprises means for securement to said trailer.

5. The anti-jackknife system of claim 3 further comprising a bar secured to and extending from said trailer, said extensible means being secured to said bar.

6. The anti-jackknife system of claim 1 further comprising means responsible to a back-up state of said tractor for maintaining said first and second normally-closed valve means in a closed state.

7. The anti-jackknife system of claim 1 further comprising means responsive to a back-up state of said tractor for disabling said first and second normally-closed valve means.

8. The anti-jackknife system of claim 1 further comprising steering motion responsive means for selectively disabling one of said first and second normally-closed valve means.

9. The anti-jackknife system of claim 8 wherein said steering motion responsive means comprises normally-open, two-way limit switch means mechanically linked to the steering mechanism of said tractor.

10. The anti-jackknife system of claim 8 further comprising means responsive to a back-up state of said tractor for disabling said first and second normally-closed valve means.

11. The anti-jackknife system of claim 1 further comprising means responsive to a back-up state of said tractor for disabling said fluid activated means.

12. The anti-jackknife system of claim 1 wherein said orientation responsive means comprises normally-open, two-way limit switch means carried by said tractor means and linkage means for connecting said limit switch means to said trailer.

13. The anti-jackknife system of claim 1 further comprising steering motion responsive means for selectively disabling one of said fluid-actuated means.

14. The anti-jackknife system of claim 11 further comprising steering motion responsive means for selectively disabling one of said fluid-actuated means.

15. The anti-jackknifing system of claim 14 wherein said jackknifing condition responsive means comprises orientation responsive means including normally-open, two-way limit switch means carried by said tractor means and linkage means for connecting said limit switch means to said trailer.

* * * * *